(12) United States Patent
Wilson

(10) Patent No.: US 6,931,933 B2
(45) Date of Patent: Aug. 23, 2005

(54) PRESSURE SENSING APPARATUS

(75) Inventor: James Brian Wilson, North Somerset (GB)

(73) Assignee: Vetco Gray Controls Limited, Nailsea (GB)

(*) Notice: Subject to any disclaimer, the term of this patent is extended or adjusted under 35 U.S.C. 154(b) by 76 days.

(21) Appl. No.: 10/666,313

(22) Filed: Sep. 18, 2003

(65) Prior Publication Data

US 2004/0060359 A1 Apr. 1, 2004

(30) Foreign Application Priority Data

Sep. 18, 2002 (GB) .............................................. 0221706

(51) Int. Cl.⁷ ................................................. G01L 7/10
(52) U.S. Cl. ........................... 73/706; 73/730; 166/368
(58) Field of Search .......................... 73/706, 716, 730; 166/345, 368

(56) References Cited

U.S. PATENT DOCUMENTS

| 5,161,415 A | | 11/1992 | Kodama |
| 5,255,743 A | * | 10/1993 | Adam et al. ................. 166/345 |
| 5,299,642 A | * | 4/1994 | Nelson et al. ............... 166/368 |
| 5,535,827 A | * | 7/1996 | Graff et al. .................. 166/368 |
| 5,796,007 A | * | 8/1998 | Panagotopulos et al. ...... 73/716 |

FOREIGN PATENT DOCUMENTS

| FR | 2004679 A | 11/1969 |
| GB | 1412631 | 11/1975 |
| GB | 1485252 | 9/1977 |
| GB | 2205952 | 12/1988 |
| GB | 2370638 | 7/2002 |
| WO | WO 00/71982 A1 | 11/2000 |

* cited by examiner

*Primary Examiner*—Edward Lefkowitz
*Assistant Examiner*—Andre Allen
(74) *Attorney, Agent, or Firm*—Bracewell & Patterson, L.L.P.

(57) ABSTRACT

A pressure sensing unit has a pressure responsive member, a pressure sensor, and a hydraulic connector hydraulically connecting the pressure responsive member with the pressure sensor to produce an indication of sensed pressure. The hydraulic connector includes a tubular member and a longitudinal insert in the tubular member with hydraulic fluid in the tubular member between the insert and the member. The tubular member, the insert and the hydraulic fluid and the dimensions of the tubular member and the insert are such that the hydraulic fluid transmitted to the pressure sensor is substantially independent of temperature changes.

7 Claims, 2 Drawing Sheets

PRESSURE SENSING APPARATUS

CROSS-REFERENCE TO RELATED APPLICATION

This application claims the benefit of United Kingdom Patent Application No. 0221706.5, filed on Sep. 18, 2002, which hereby is incorporated by reference in its entirety.

BACKGROUND OF THE INVENTION

1. Technical Field of the Invention

The present invention relates to pressure sensing apparatus, for example for sensing pressure in a fluid extraction well such as a hydrocarbon extraction well.

2. Background of the Invention

FIG. 1 shows, diagrammatically in section, typical existing pressure sensing apparatus as an assembly 1 fitted in a hydrocarbon production fluid extraction well. The assembly 1 is typically attached to the wall of a fluid extraction pipe 2 via a flange 3. In order to prevent the fluid flow of wellbore product whose pressure is to be sensed from contaminating and blocking the pressure sensing aperture, a flush diaphragm 4 is fitted over the aperture, the diaphragm hydraulically connecting to a remote pressure sensor 5, in the example a quartz device, via a hydraulic, oil filled, very small bore, tubing 6 and hydraulic oil in a cavity 7 defined by a funnel 8. The pressure sensor 5 is located close to an electronic unit 9 which contains an oscillator for the quartz device and converts the electrical output of the pressure sensor 5 into a form suitable for transmission remotely from the assembly 1. The hydraulic tube 6 connecting the diaphragm 4 to the pressure sensor 5 is typically fitted with a facility 10 to evacuate it and permit filling the tube with hydraulic fluid. The pressure sensor 5 and electronic unit 9 are mounted at the cool end of the assembly 1 (that is in a cool environment, e.g. sea water, as compared with the inside of pipe 2), in order to maximise the life of the assembly.

A problem with such pressure sensor assemblies is that there is a differential thermal expansion between the tube 6 and the hydraulic fluid in the tube, causing errors in pressure measurements. Although some attempt is often made to compensate for this by adjustment in the electronics, this is generally inadequate, particularly under transient conditions, leaving significant errors in pressure measurement.

SUMMARY OF THE INVENTION

According to the present invention, there is provided pressure sensing apparatus comprising a pressure responsive means and hydraulic connecting means hydraulically connecting the pressure responsive means with the pressure sensing means. This connection produces an indication of sensed pressure. The hydraulic connecting means comprises a tubular member and a longitudinal insert in the tubular member. Hydraulic fluid is contained in the tubular member between the insert and the member. The tubular member, the insert and the hydraulic fluid and the dimensions of the tubular member and the insert are such that the pressure transmitted hydraulic fluid to the sensing means in use of the apparatus is substantially independent of temperature changes.

Preferably, the tubular member is metallic. The insert may be in the form of a rod. Preferably, the volumetric coefficient of thermal expansion of the material of the tubular member is less than that of the hydraulic fluid and greater than that of the material of the insert. For example, the volumetric coefficient of thermal expansion of the material of the tubular member could be substantially $30 \times 10^{-6}/°$ C., that of the material of the insert substantially $0.5 \times 10^{-6}/°$ C. and that of the hydraulic fluid substantially $300 \times 10^{-6}/°$ C., the insert occupying substantially 95% of the internal volume of the tubular member.

The pressure responsive means could comprise a diaphragm. The pressure sensing means could comprise a pressure sensor and electronic circuitry connected with it.

DETAILED DESCRIPTION OF THE PREFERRED EMBODIMENT

Figure 1:
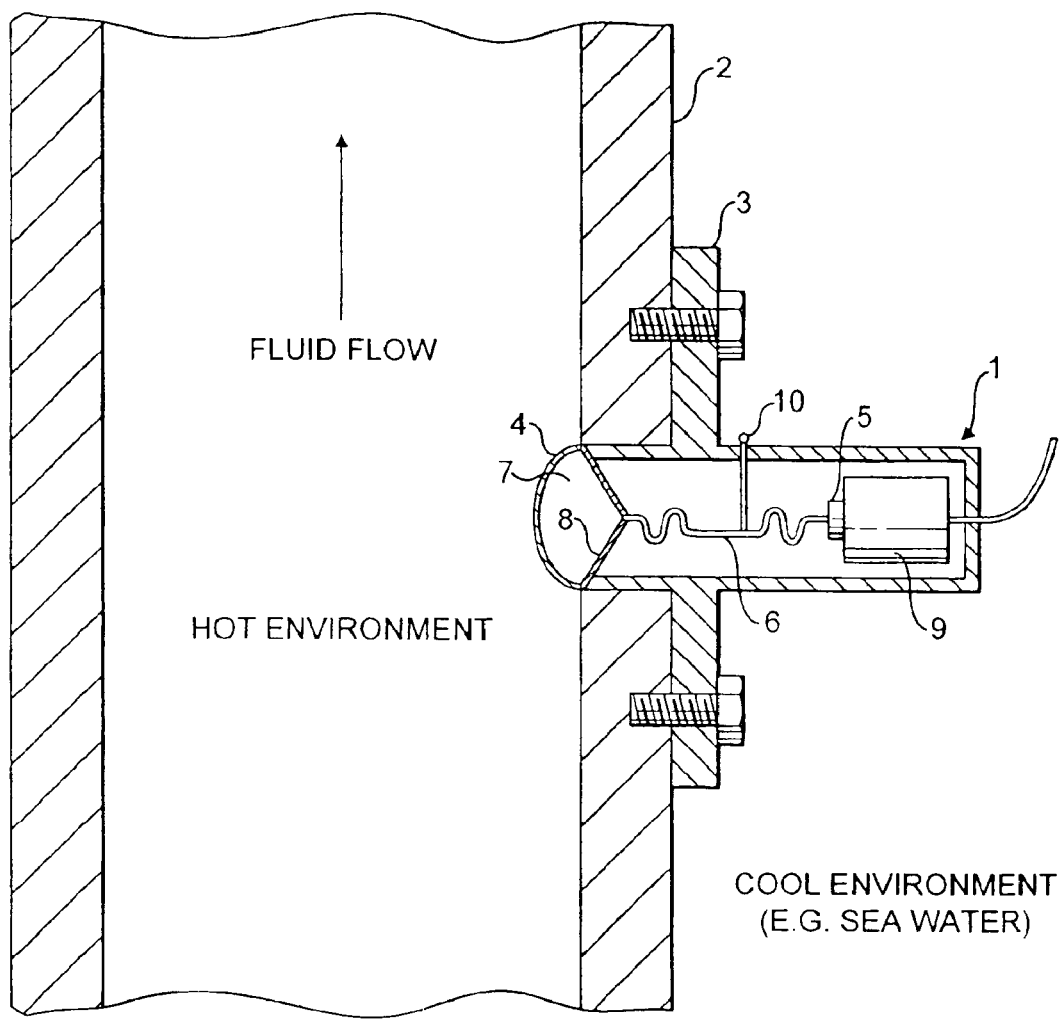
FIG. 1 is a sectional view of a prior art pressure sensing apparatus.
Figure 2:
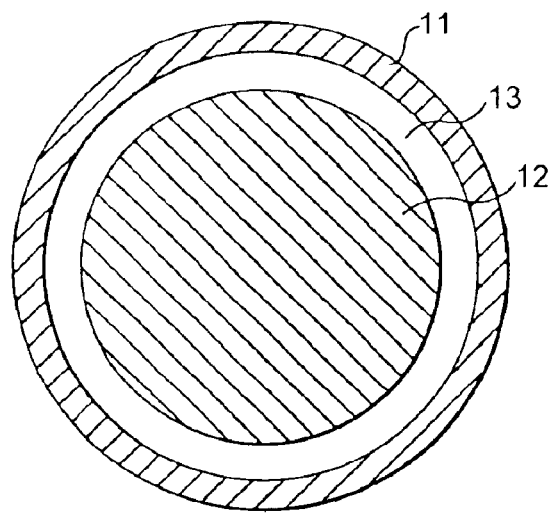
FIG. 2 is a transverse sectional view of a pressure sensing apparatus constructed in accordance with the invention.

FIG. 2 shows a sectioned view of a metal tube 11 for use instead of tube 6 in FIG. 1. The tube 11 is made of metal with a volumetric thermal co-efficient of expansion of typically $30 \times 10^{-6}/°$ C. Inserted in the tube 1 is a longitudinal insert in the form of a rod 12, typically made of silica, which is smaller in diameter than the inner diameter of the tube 11 and has, typically, a volumetric thermal co-efficient of $0.5 \times 10^{-6}/°$ C. The annular space 13, between the tube 11 and the rod 12, is filled with hydraulic fluid (e.g. oil) which, typically, has a volumetric thermal co-efficient of expansion of $300 \times 10^{-6}/°$ C. When the temperature of the tube 11 increases, the volume of space 13 increases in dependence on the difference between the volumetric thermal co-efficients of expansion of the tube 11 and the rod 12. The internal diameter of the tube 11 and diameter of the rod 12 are arranged such that the increase of volume of space 13 for a given rise in temperature substantially matches the increase in space of the hydraulic oil filling this volume, for the same temperature rise. As the two volume increases substantially match, there is substantially no change in pressure applied by the hydraulic fluid due to a temperature rise, irrespective of the length of the tube 11. The same situation applies to a fall in temperature of the tube 11. Thus, the hydraulic fluid will transmit the pressure from a diaphragm to a pressure sensor substantially without errors resulting from temperature changes of the tube 11, the pressure transmitted by the fluid being substantially independent of temperature. Typically, with the examples of temperature coefficients quoted, the rod 12 will need to occupy substantially 95% of the internal volume of the metal tube 11. The percentages can be calculated once the precise expansion rates for the actual choice of the different materials employed to implement the tube 11 and rod 12 are known.

The above temperature compensation of pressure changes due to thermal changes is irrespective of the overall diameter of tube 11, which can be of any diameter required. Thus it can be made large enough to remove the problems of contamination blockages of the very small bore tubes traditionally needed, by ensuring that the space 13 for the hydraulic fluid is substantial.

Figure 3:
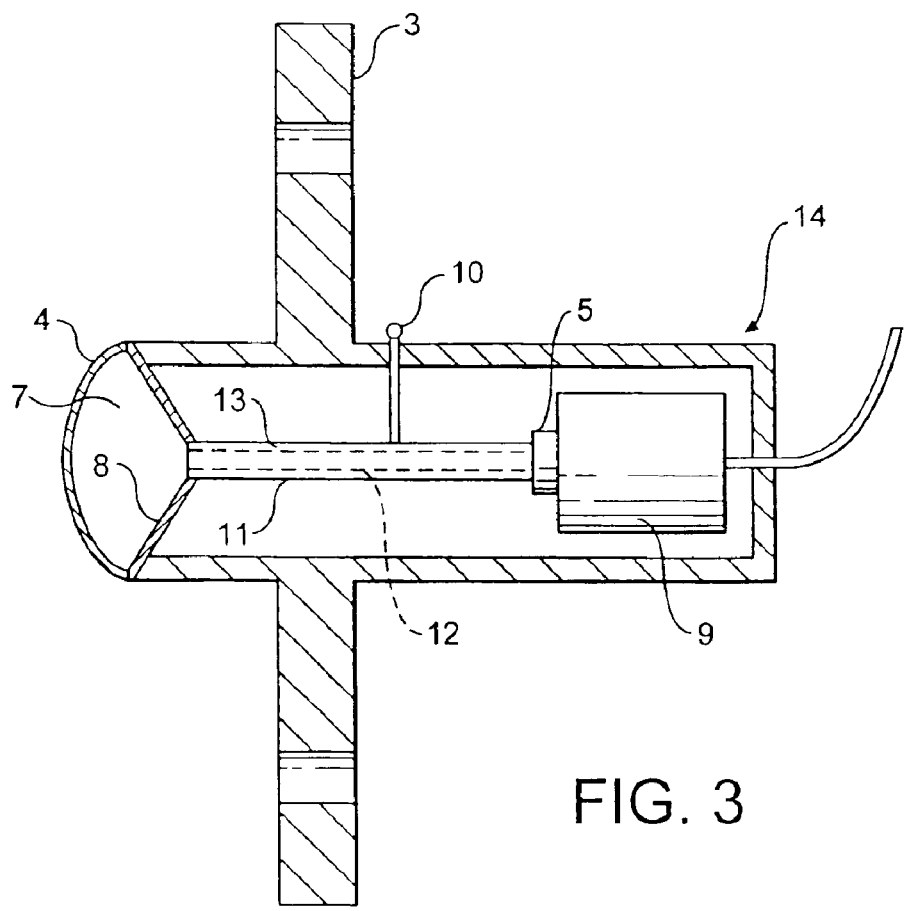
FIG. 3 is a vertical sectional view of the pressure sensing apparatus of FIG. 2.

FIG. 3, in which items which correspond with those in FIG. 1 have the same reference numerals, shows pressure sensing apparatus in the form of an assembly 14 in which, instead of a small bore tubing 6, there is a tube 11 with a rod 12 as described above, hydraulically connecting diaphragm 4 with pressure sensor 5. Longitudinal expansion of the tube 11 and rod 12 can be accommodated by appropriate mounting of the pressure sensor 5 and electronic unit 7.

Suitable materials for the rod insert 12 have a very low coefficient of thermal expansion and are incompressible at the working pressure of the assembly 14. Although silica is one such material, there may also be other suitable materials such as some grades of glass (Pyrex) and ceramic and some exotic metals (Invar) that can perform the required function equally as well.

What is claimed is:

1. Pressure sensing apparatus for sensing well fluid pressure comprising well fluid conduit;
   a pressure responsive member in fluid communication with well fluid in the fluid conduit;
   a pressure sensor;
   a hydraulic connector hydraulically connecting the pressure responsive member with the pressure sensor to produce an indication of sensed pressure of the well fluid in the well fluid conduit; and wherein:
   the hydraulic connector comprises a tubular member and a longitudinal insert in the tubular member with hydraulic fluid in the tubular member in an annular space between the insert and the tubular member, the tubular member, the insert and the hydraulic fluid and the dimensions of the tubular member and the insert being such that during use of the apparatus, the hydraulic fluid pressure transmitted to the pressure sensor is substantially independent of temperature changes.

2. The apparatus according to claim 1, wherein the tubular member is metallic.

3. The apparatus according to claim 1, wherein the insert is in the form of a rod.

4. The apparatus according to claim 1, wherein the volumetric coefficient of thermal expansion of the material of the tubular member is less than that of the hydraulic fluid and greater than that of the material of the insert.

5. The apparatus according to claim 4, wherein the volumetric coefficient of thermal expansion of the material of the tubular member is substantially $30 \times 10^{-6}/°$ C., that of the material of the insert is substantially $0.5 \times 10^{-6}/°$ C., that of the hydraulic fluid is substantially $300 \times 10^{-6}/°$ C. and the insert occupies substantially 95% of the internal volume of the tubular member.

6. The apparatus according to claim 1, wherein the pressure responsive member comprises a diaphragm.

7. The apparatus according to claim 1, wherein the pressure sensor comprises an electronic pressure sensing device.

* * * * *